United States Patent
Sugiyama

[11] Patent Number: 6,029,536
[45] Date of Patent: Feb. 29, 2000

[54] SHIFT LEVER ASSEMBLY WITH BREAKABLE RETAINING MEMBER UPON APPLICATION OF EXCESSIVE FORCE

[75] Inventor: Takashi Sugiyama, Wako, Japan

[73] Assignee: Honda Giken Kogyo Kabushiki Kaisha, Tokyo, Japan

[21] Appl. No.: 08/917,096

[22] Filed: Aug. 25, 1997

[30] Foreign Application Priority Data

Aug. 27, 1996 [JP] Japan .................................... 8-244177

[51] Int. Cl.$^7$ .............................. B60K 20/00; F16F 7/12
[52] U.S. Cl. ................................... 74/473.31; 74/473.33; 188/371; 188/376; 188/377
[58] Field of Search ........................... 74/473.31, 473.33; 188/371, 376, 377

[56] References Cited

U.S. PATENT DOCUMENTS 2,193,218  3/1940  Best ...................................... 74/473.31
3,707,095  12/1972  Uhlenhaut et al. .................. 74/473.31

Primary Examiner—Thomas R. Hannon
Assistant Examiner—Colby M. Hansen
Attorney, Agent, or Firm—Armstrong, Westerman, Hattori, McLeland and Naughton

[57] ABSTRACT

In a shift lever assembly for a vehicle comprising a base member and a shift lever pivotably supported by the base member, the shift lever is detachable from the base member when an excessive force greater than a prescribed value is applied to the shift lever. Typically, the base member comprises a retaining member for holding the shift lever in an operable position and the retaining member is given a strength so as to break when an excessive force greater than a prescribed value is applied to the retaining member to thereby release the shift lever. In this way, when an excessive force greater than a prescribed value is applied to the shift lever for example by being hit against by a driver or a passenger in a traffic accident, the shift lever is detached from the base and retracted into the instrument panel, thereby effectively preventing the shift lever from causing damage to the driver or passenger. This shift lever assembly is especially suitable for installation in the instrument panel facing the driver or passenger.

12 Claims, 4 Drawing Sheets

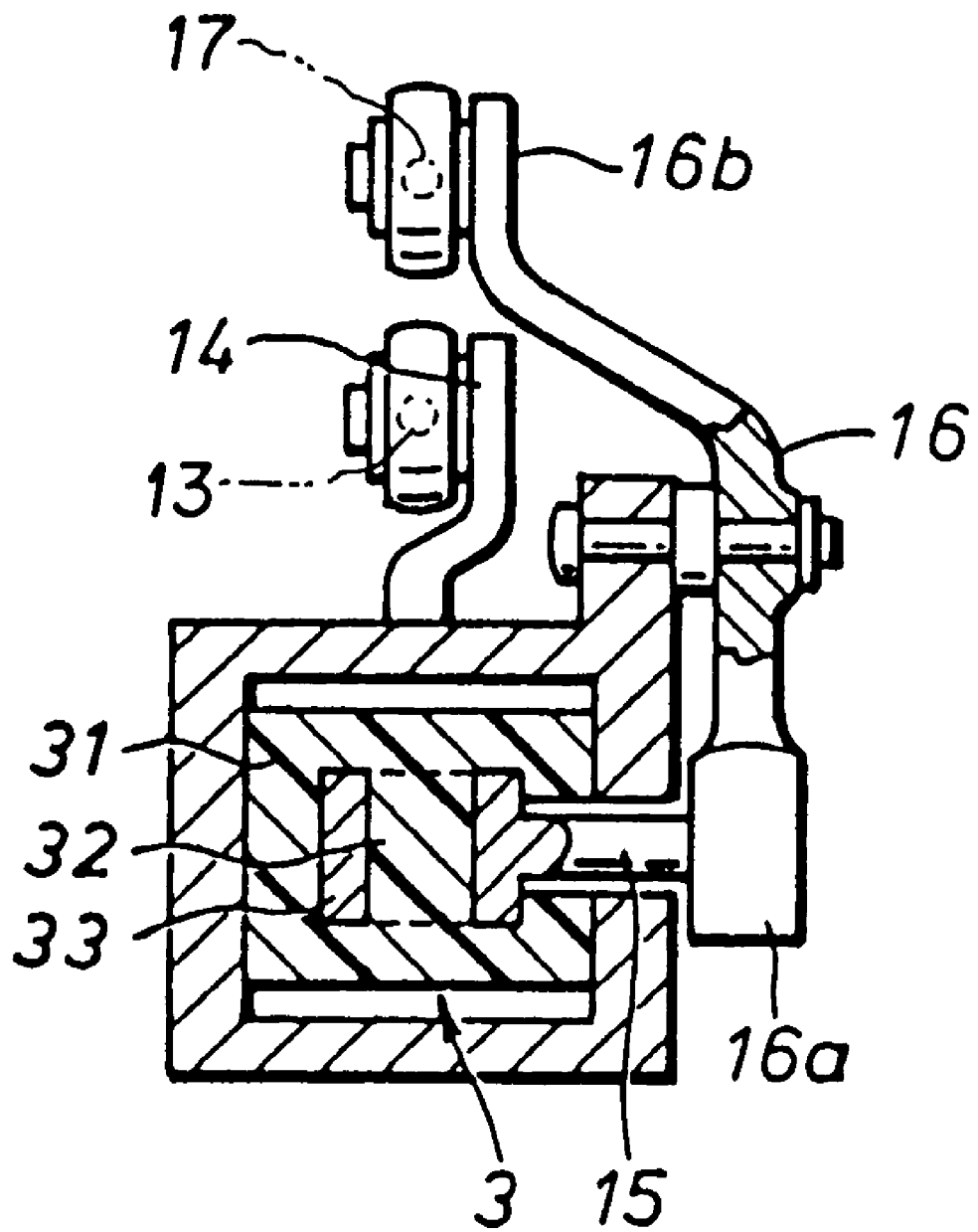

SHIFT LEVER ASSEMBLY WITH BREAKABLE RETAINING MEMBER UPON APPLICATION OF EXCESSIVE FORCE

TECHNICAL FIELD

The present invention relates to a shift lever assembly of a vehicle.

BACKGROUND OF THE INVENTION

A shift lever for controlling the gear-shift of the transmission of a vehicle is often installed in a center floor of the vehicle. Although this configuration is suitable for directly operating the transmission in a front-engine/rear-drive (FR) vehicle, it is not necessarily suitable for an automatic transmission in a front-engine/front-drive (FF) vehicle. In such a case, it may be more preferable to provide the shift lever in an instrument panel near a steering wheel in order to achieve both good operability of the shift lever and comfortableness of the vehicle interior, particularly in a relatively small vehicle where the interior space is limited.

In order to efficiently transmit the movements of a driver-operated shift lever to the transmission, it is usually preferable that a shift lever assembly have high rigidity and have no play in the mechanical parts thereof. However, in installation of such a shift lever assembly in an instrument panel facing a driver or passenger, it is preferable that the shift lever assembly can absorb a force applied to the shift lever when the shift lever is hit against by the driver or passenger, for example in a traffic accident, to thereby effectively prevent the shift lever from causing injury to the driver or passenger.

BRIEF SUMMARY OF THE INVENTION

Therefore, a primary object of the present invention is to provide a shift lever assembly which is suitable for installation in an instrument panel facing a driver or passenger.

A second object of the present invention is to provide a shift lever assembly which can effectively absorb a force applied to the shift lever when the shift lever is hit against by a driver or passenger in a traffic accident or the like, to thereby effectively prevent the shift lever from causing injury to the driver or passenger.

A third object of the present invention is to provide such a shift lever assembly as to be simple in design and reasonable in cost.

To achieve the above objects, the present invention provides a shift lever assembly for a vehicle comprising: a base member; and a shift lever pivotally supported by the base member and is detachable from the base member when an excessive force greater than a prescribed value is applied to the shift lever. The base member preferably comprises a retaining member for holding the shift lever in an operable position and for releasing the shift lever when an excessive force greater than a prescribed value is applied to the shift lever. When a gimbal joint is used for pivotally supporting the shift lever, the retaining member may support the gimbal joint.

In one preferred embodiment of the present invention, the shift lever assembly, comprises a pivot member for supporting the shift lever so that the shift lever is pivotable around a selection axis, the pivot member being mounted in the base member so as to be pivotable around a shifting axis which is at a right angle to the selection axis, and the retaining member supports the pivot member. Typically, the pivot member is generally cylindrical in shape, the base member comprises a case adapted for mounting the pivot member so that the pivot member is pivotable around the shifting axis, the case having a bottom opening, and the retaining member is fastened in the bottom opening of the case to support the pivot member. The retaining member can be fastened in the bottom opening of the case of the base member with its edge portion being engaged with a groove formed in an inside surface of the bottom opening and is preferably given a strength so as to break when an excessive force greater than a prescribed value is applied to the retaining member.

In this manner, when an excessive force greater than a prescribed value is applied to the shift lever for example by being hit against by a driver or passenger, the retaining member for holding the shift lever in an operable position is removed so that the shift lever is detached from the base member and retracted into the instrument panel, thereby effectively preventing the shift lever from causing injury to the driver or passenger. Thus, this shift lever assembly is especially suitable for installation in the instrument panel facing the driver or passenger, and therefore is greatly beneficial in achieving both good operability of the shift lever and comfortableness of the vehicle interior especially in a relatively small vehicle.

Other and further objects, features and advantages of the invention will appear more fully from the following description.

BRIEF DESCRIPTION OF THE DRAWINGS

Now the present invention is described in the following with reference to the appended drawings, in which:

FIG. 4 is a cross sectional view taken along the line IV—IV in FIG. 3.

DETAILED DESCRIPTION OF THE PREFERRED EMBODIMENTS

Figure 1:
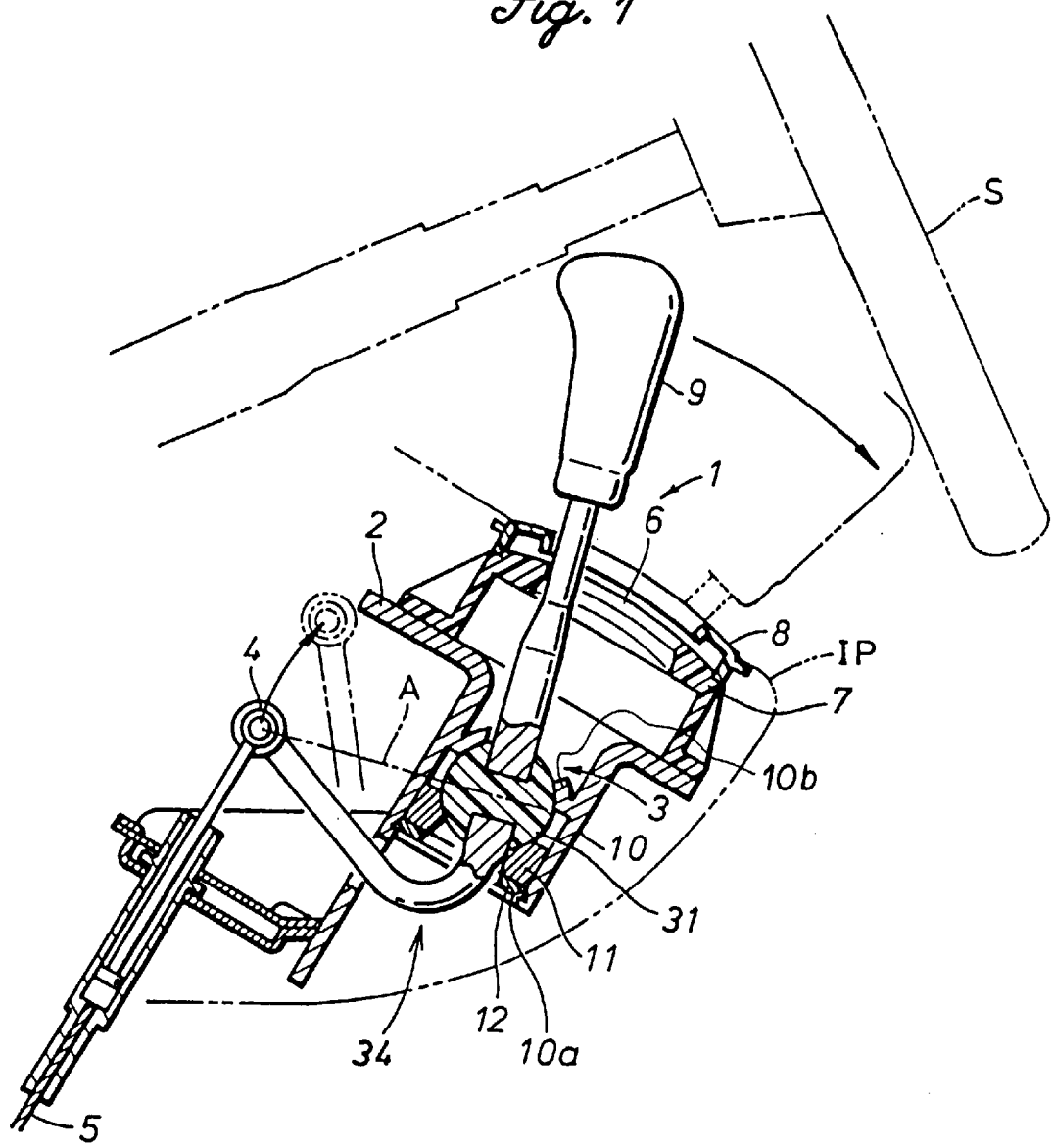
FIG. 1 is a side cross sectional view of a shift lever assembly according to the present invention.

FIG. 1 shows one embodiment of a shift lever assembly according to the present invention. As shown in the drawing, a shift lever 1 is supported by a gimbal joint 3 provided in a base 2 which is securely attached in an instrument panel IP at a position near a steering wheel S. The gimbal joint 3 allows the shift lever 1 to be pivotally moved in both for-and-aft (shifting) direction around a shifting axis and lateral (selecting) direction around a selection axis. The shifting and selection axes are at a right angle to each other. This shift lever assembly is suitable for use with an automatic transmission which may be manually shifted by the shift lever moved so as to follow a gate-pattern (or guide slot) adapted for providing proper control to such manual range selection. Further, when provided with means for transmitting the selection movements of the shift lever 1, as described in more detail later, this shift lever assembly can also be used with a manual transmission having a generally "H"-shaped gear shift pattern.

As shown in FIG. 1, the shift lever 1 extending through the gimbal joint 3 has an extension 34 having an end 4 which is connected to a cable 5, which in turn is connected to a control lever (not shown) of the automatic transmission. The extension 34 is curved in a hook-like manner so that the end 4 lies on the selection axis of the shift lever 1. In this way, the selection movements of the shift lever 1 do not cause the end 4 of the shift lever 1 to move transversely, thereby preventing the bending of the cable 5 connected to the end 4.

Mounted on the base 2 is a guide plate 7 including a guide slot 6 through which the shift lever 1 extends, the guide slot 6 determining the allowable movements of the shift lever 1. The upper surface of the guide plate 7 is preferably covered by an aesthetically colored and textured outer surface 8. Further, a knob 9 to be handled by the driver is attached to the upper end of the shift lever 1.

Figure 3:
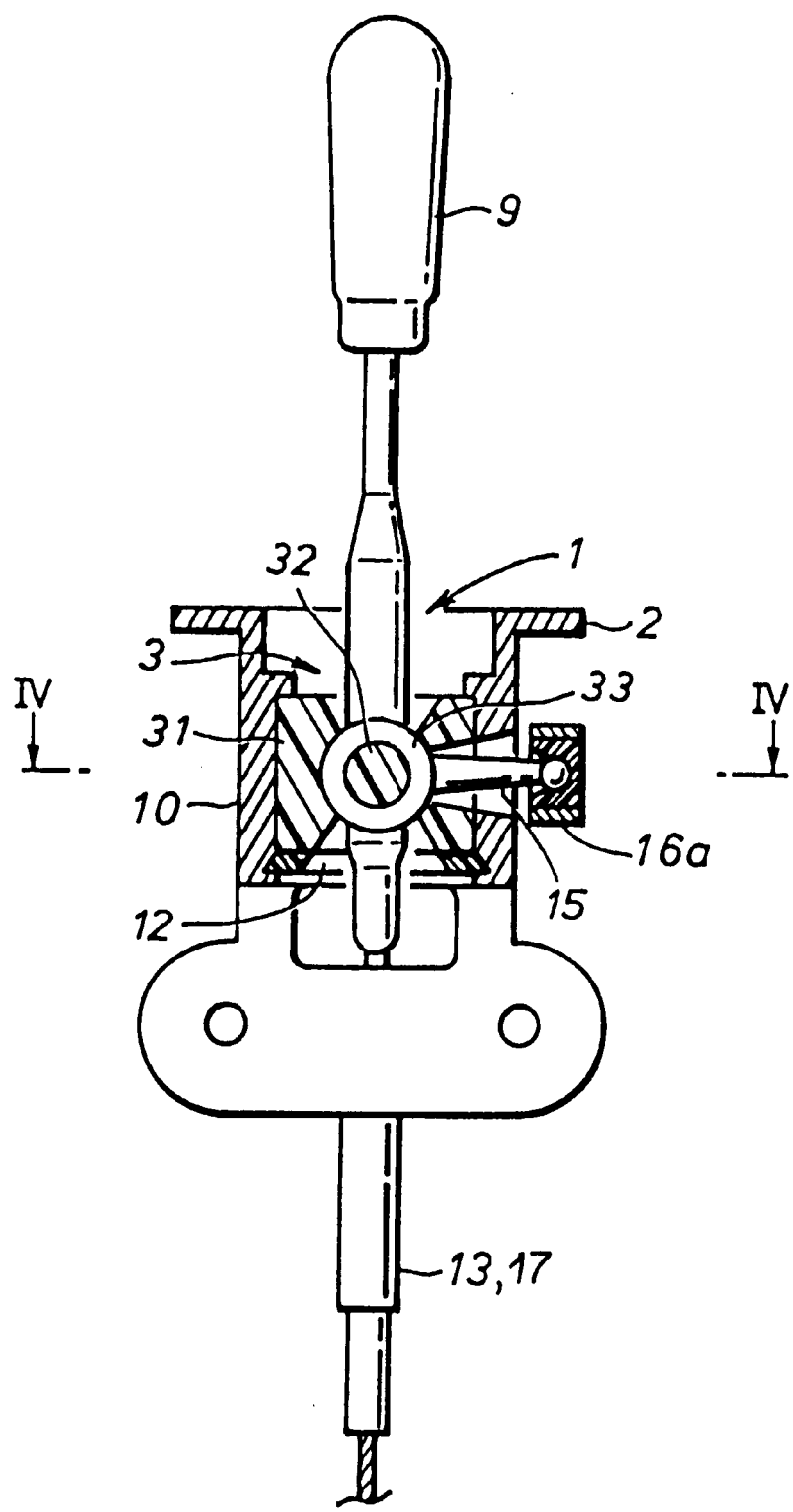
FIG. 3 is a cross sectional view taken along the line III—III in FIG. 2.

Also referring to FIGS. 3 and 4, the gimbal joint 3 comprises a generally cylindrically-shaped pivot member 31 which is mounted in a case 10 formed in the base 2 adapted so that the pivot member 31 is pivotable around the shifting axis. The pivot member 31 is provided with a hollow (or through-hole) through which the shift lever 1 extends, and in the hollow the pivot member 31 further includes a pivot pin 32 aligned with the selection axis. On the pivot pin 32 is fitted an annular part 33 formed in the shift lever 1 so that the shift lever 1 can pivot around the pivot pin 32, i.e., around the selection axis. In this way, the shift lever 1 is supported so as to be pivotable around the shifting and selection axes which are at a right angle to each other.

In assembling this shift lever assembly (FIG. 1), first the shift lever 1 attached beforehand in the pivot member 31 is inserted upwardly into the case 10 through a bottom opening 10a thereof to mount the pivot member 31 in the case 10 together with a lower seat member 11. An upper seat member 10b, having a spherical inner surface to pivotally retain the pivot pin 31, is provided on the inside of the case 10. Then, a retaining member 12 is pushed in the bottom opening 10a so that its edge portion is securely engaged with a groove formed in an inside surface of the opening 10a as shown in the drawing. When pushed in the bottom opening 10a, the retaining member 12 is somewhat deformed toward inside, and once the edge portion thereof is engaged with the groove of the opening 10a, the retaining member 12 is securely fastened to the opening 10a. In this configuration, if an excessive force is applied to the shift lever 1 and hence to the retaining member 12 for instance when an abrupt deceleration of the vehicle causes a driver or passenger to move forward and to hit against the shift lever 1, the edge portion of the retaining member 12 breaks so that the retaining member 12 drops off from the opening 10a of the case 10 and the shift lever 1 is detached from the base 2 and retracted into the instrument panel IP.

This shift lever assembly may be equipped with an interlock mechanism, such as for preventing a particular range selecting operation or reverse-gear selecting operation of the shift lever under certain conditions, and/or may be equipped with a detent mechanism for giving a detent feel to the driver when operating the shift lever. However, because these optional functions are not directly related to the principle of the present invention, further description thereof is omitted.

Figure 2:
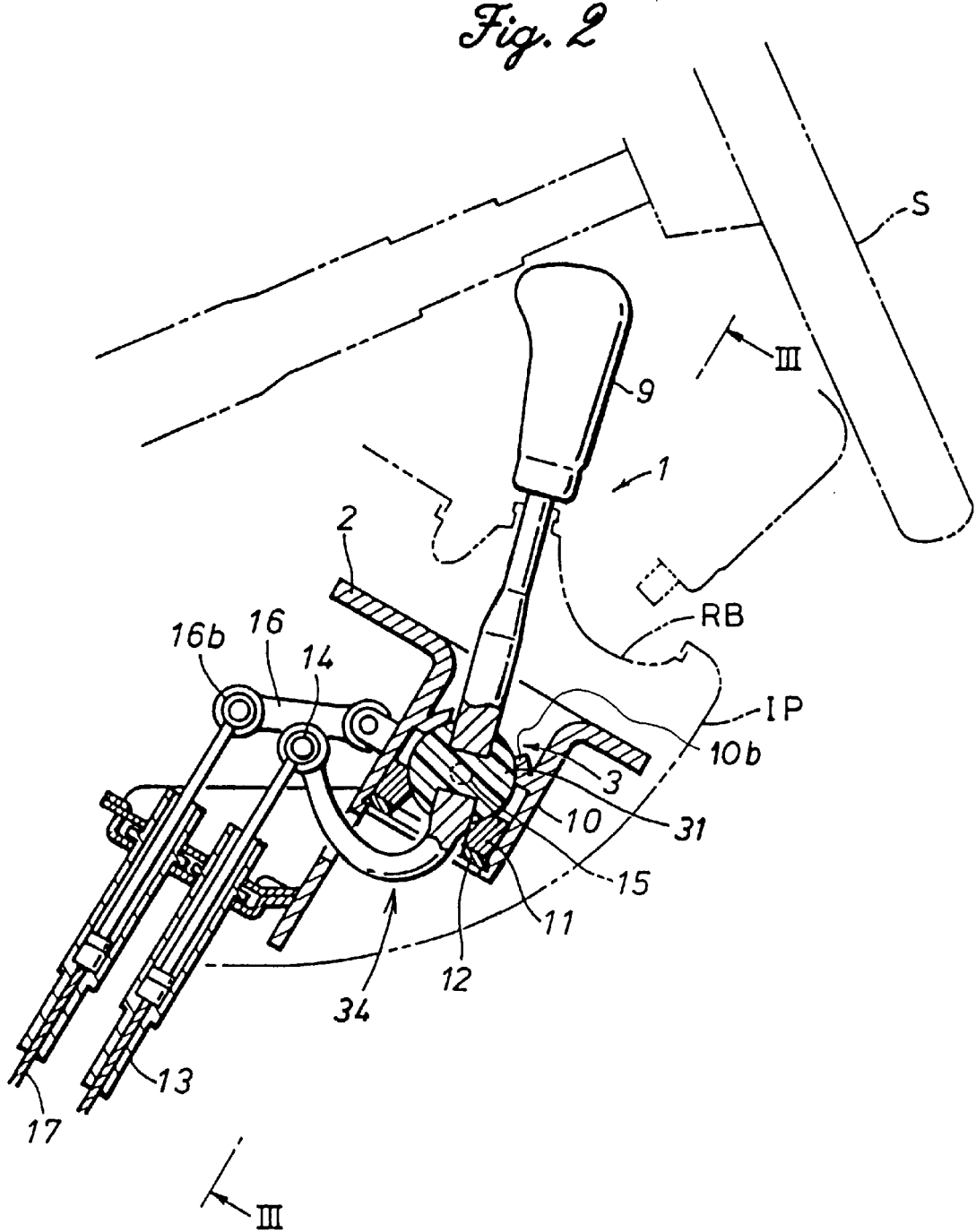
FIG. 2 is a side cross sectional view of a shift lever assembly according to the present invention adapted for use with a manual transmission.

FIGS. 2 to 4 illustrate another embodiment of the shift lever assembly according to the present invention. This embodiment is adapted for use with a manual transmission. In this embodiment, the angle of the hook-like bend of the shift lever 1 is more acute than in the first embodiment, so that the end 14 connected to the cable 13 for transmitting the shifting movements is brought closer to the gimbal joint 3 in order to provide a room for accommodating another cable 17 for transmitting the selection movements of the shift lever 1 to the transmission. However, the end 14 also lies on the selection axis of the shift lever 1 in the same fashion as in the first embodiment. The second cable 17 is attached to one end 16b of a lever member 16 for transmitting the selection movements of the shift lever 1. The other end 16a (FIG. 3) of the lever member 16 is connected in the ball-and-socket joint manner to a spherical part formed at the free end of an arm 15 extending substantially laterally from the annular part 33 of the shift lever 1 and through an opening provided in a lateral side of the pivot member 31 (shown in FIGS. 3 and 4). A middle portion of the lever member 16 is connected to the base 2 so as to be pivotable around a pivot axis parallel to the shifting axis (best shown in FIG. 4) so that the lever member 16 operates in a seesaw-like fashion.

In this configuration, when the shift lever 1 is moved in the forward direction, the first cable 13 is pushed downward, and when the shift lever 1 is moved in the rearward direction, the first cable 13 is pulled upward, to thereby transmit the for-and-aft (or shifting) movements of the shift lever 1 to the transmission. When the shift lever 1 is moved to the left, the spherical part of the arm 15 is moved upward to push down the second cable 17, and when the lever 1 is moved to the right, the spherical part of the arm 15 is moved downward to pull up the second cable 17, to thereby transmit these lateral (selecting) movements of the lever 1 to the transmission. In this configuration, the shifting movements of the shift lever 1 do not substantially move the second cable 17 longitudinally, and the selection movements of the shift lever 1 do not substantially move the first cable 13 transversely, and further, only the pushing and pulling forces are applied to the cables 13 and 17 as in the first embodiment.

In the manual transmission, because the shift pattern is determined by the transmission mechanism itself, the guide plate 7 and the outer surface 8 used in the first embodiment can be omitted. Instead, in the second embodiment, the upper opening formed in the instrument panel IP for accommodating the shift lever 1 is covered by a suitable protective cover such as a rubber boot RB. The base 2 with two holes in its bottom for the cables 13 and 17 in the second embodiment can also be used without any significant modification in the first embodiment in which the base 2 is required to have only one hole for the cable 3 because the unused hole does not adversely affect the shift lever assembly either functionally or aesthetically. Additionally, because the shift control of the manually shiftable automatic transmission can be provided by the guide plate 7 as shown in the first embodiment without using an additional interlock mechanism, the shift lever 1 does not have to be equipped with an additional mechanism such as a push button for releasing the interlock mechanism. Therefore, the shift lever 1 can be commonly used in the first and second embodiments. Further, although the present invention can be practiced with a ball joint instead of a gimbal joint such as shown in the embodiments, when a gimbal joint is used for pivotally supporting the shift lever, there is an advantage that the rotation of the shift lever around its longitudinal axis can be prevented even in the case of an automatic transmission where only a cable for transmitting the shifting movements of the shift lever is used and there is no lever member 16 or the like which can function to prevent the rotation of the shift lever around its longitudinal axis in the case of a manual transmission. Thus, most of the components of the shift lever assemblies shown in the first and second embodiments for use with an automatic transmission and for use with a manual transmission, respectively, can be commonly used.

As described in the above, in a shift lever assembly according to the present invention, when an excessive force greater than a prescribed value is applied to the shift lever for example by being hit against by a driver or passenger, the retaining member for holding the shift lever in an operable position is removed so that the shift lever is detached from the base and retracted into the instrument panel, thereby effectively preventing the shift lever from causing damage to the driver or passenger. Thus, this shift lever assembly is especially suitable for installation in the instrument panel facing the driver or passenger, and therefore is greatly beneficial in achieving both good operability of the shift lever and comfortableness of the vehicle interior especially in a relatively small vehicle.

Although the present invention has been described in terms of specific embodiments thereof, it is possible to modify and alter details thereof without departing from the spirit of the present invention. For example, the extension of the shift lever 1 may extend from a part of the shift lever 1 above the gimbal joint 3 as long as the connection between the extension and the cable lies on the selection axis. Further, the retaining member 12 may be fastened in the opening 10a of the case 10 by various means other than shown in the embodiments. For example, the retaining member 12 can be fastened by screws or adhesive or by being pressingly engaged with the opening 10a so that when an excessive force is applied to the retaining member 12, the retaining member 12 breaks or dislodges from the opening 10a to allow the shift lever 1 to be detached from the base 2 and retracted into the instrument panel IP.

What is claimed is:

1. A shift lever assembly for a vehicle, comprising:
   a base member;
   a shift lever pivotally supported by said base member and detachable from said base member when en excessive force greater than a prescribed value is applied to said shift lever;
   a retaining member provided on said base member for holding said shift lever in an operable position, said retaining member releasing said shift lever from said base member when an excessive force greater than a prescribed value is applied to said shift lever; and
   a pivot member for supporting said shift lever so that said shift lever is pivotable around a selection axis, said pivot member mounted in said base member so as to be pivotable around a shifting axis which is at a right angle to the selection axis, wherein said retaining member supports said pivot member,
   wherein said pivot member is generally cylindrical in shape, said base member comprises a case adapted for mounting said pivot member so that said pivot member is pivotable around said shifting axis, said case having a bottom opening, and said retaining member is fastened in the bottom opening of said case to support said pivot member.

2. A shift lever assembly according to claim 1, further comprising a gimbal joint for pivotally supporting said shift lever, wherein said retaining member supports said gimbal joint.

3. A shift lever assembly according to claim 1, wherein said retaining member is fastened in the bottom opening of said case of said base member with its edge portion engaged with a groove formed in an inside surface of the bottom opening, said retaining member having a strength so as to break when an excessive force greater than a prescribed value is applied to said retaining member.

4. A shift lever assembly according to claim 1, wherein said retaining member has a strength so as to break when an excessive force greater than a prescribed value is applied to said retaining member.

5. A shift lever assembly according to claim 1, wherein said shift lever assembly is installed in an instrument panel near a steering wheel.

6. A shift lever assembly for a vehicle, comprising;
   a shift lever having a pivot member attached to a lower part thereof;
   a base member having a case defining an open bottom and adapted to receive said pivot member of said shift lever therein;
   a seat assembly for pivotally receiving said pivot member in said case so that said shift lever may be pivotable at least around a selection axis; and
   said seat assembly comprising a lower seat member which is retained in an operable position by a retaining member, said retaining member being fastened in said bottom opening of said case to retain said pivot member at said operation position and adapted to release said shift lever when an excessive axial force greater than a prescribed value is applied to said shift lever.

7. A shift lever assembly according to claim 6, wherein said pivot member is supported by said seat assembly so as to be pivotable around a shifting axis which is at a right angle to said selection axis.

8. A shift lever assembly according to claim 7, wherein a pair of arms extend from said pivot member for actuating respective control elements of a transmission.

9. A shift lever assembly according to claim 6, wherein said pivot member is generally cylindrical in shape.

10. A shift lever assembly according to claim 6, wherein said retaining member is fastened in the bottom opening of said base member with its edge portion engaged with a groove formed in an inside surface of the bottom opening, said retaining member having a strength so as to break when an excessive force greater than a prescribed value is applied to said retaining member.

11. A shift lever assembly according to claim 6, wherein said retaining member has a strength so as to break when an excessive force greater than a prescribed value is applied to said retaining member.

12. A shift lever assembly according to claim 6, wherein said shift lever assembly is installed in a part of an instrument panel near a steering wheel.

* * * * *